Oct. 26, 1948.  C. C. STUART  2,452,270
TRAILER
Filed March 5, 1945  2 Sheets-Sheet 1
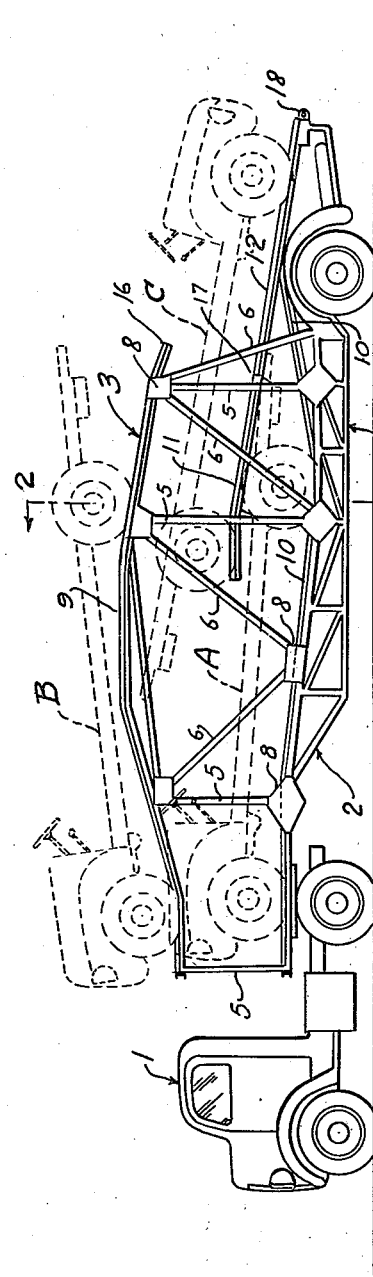
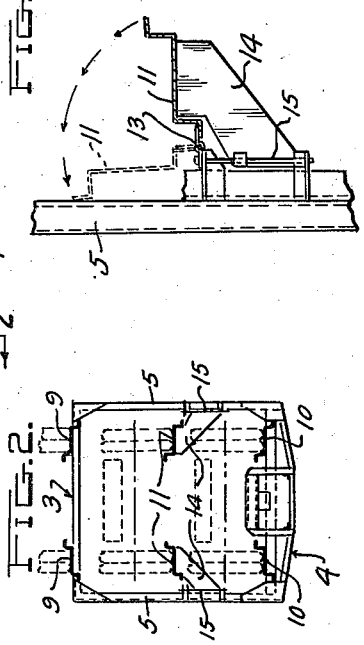
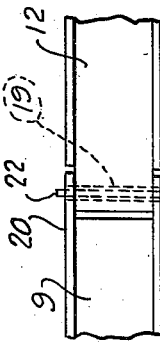
INVENTOR.
Clarence C. Stuart
BY
Barnes, Kisselle, Laughlin & Raisch
Attorneys.

Oct. 26, 1948.  C. C. STUART  2,452,270
TRAILER
Filed March 5, 1945  2 Sheets-Sheet 2
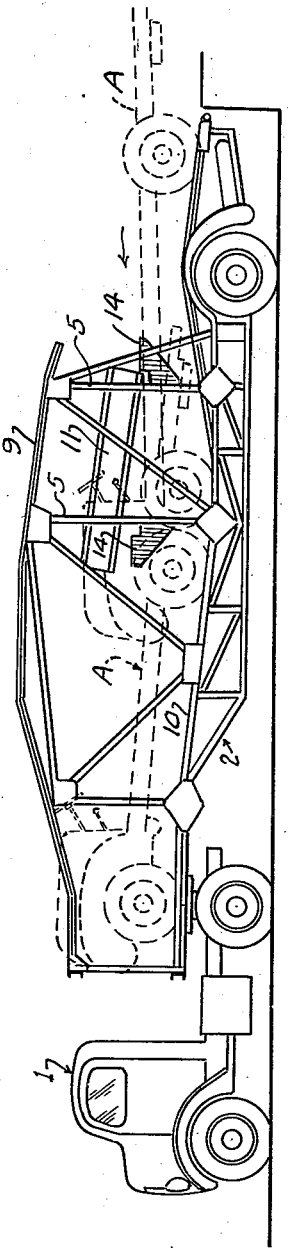
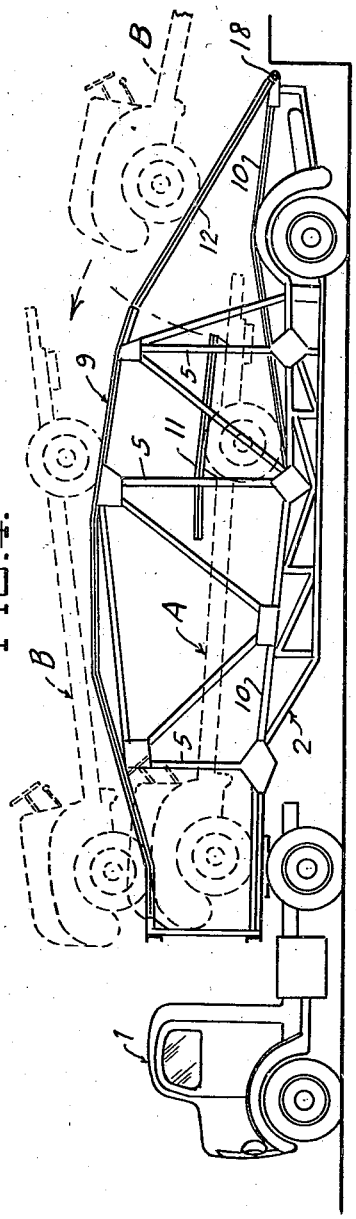
INVENTOR.
Clarence C. Stuart
BY
Barnes, Kisselle, Laughlin & Raisch
Attorneys.

Patented Oct. 26, 1948

2,452,270

UNITED STATES PATENT OFFICE 2,452,270

TRAILER

Clarence C. Stuart, Dearborn, Mich., assignor to Traffic Transport Engineering, Inc., Dearborn, Mich., a corporation of Michigan Application March 5, 1945, Serial No. 581,063

7 Claims. (Cl. 296—1)

1

This invention relates to a trailer and method of loading the same.

It is an object of this invention to produce a trailer for carrying a plurality of automotive vehicle chassis, such, for example, as bus chassis, which is of simple structure, easy to load and unload, and which is economical of space and more efficient than trailers presently in use because my trailer is capable of carrying a greater number of bus chassis than such trailers now in use.

Fig. 1 is a side elevation showing my trailer fully loaded.

Fig. 2 is a section along the line 2—2 of Fig. 1.

Fig. 3 is a side elevation of my trailer showing the first step in the loading of my trailer.

Fig. 4 is a side elevation showing the second step in the loading of my trailer.

Fig. 5 is a detailed sectional view of the foldable track for supporting the rear end of the last bus chassis to be loaded.

Fig. 6 is a detail of the track.

Referring more particularly to the drawings there is shown a motor tractor 1 and a trailer generally designated 2. The trailer 2 can be made from suitable material, but preferably is made from a structural metal such as steel.

The trailer comprises a top frame 3 and a bottom frame 4. Top frame 3 is supported at each side upon bottom frame 4 by posts 5 and reinforced by diagonal braces 6. Posts 5 and braces 6 are fixed to the top and bottom frames by welding and the joints are also reinforced by gusset plates 8 which are also welded to the posts, braces and frames. The frames 3 and 4, posts 5 and braces 6 can be made from structural metal or steel having any suitable cross-section to give it sufficient strength for its intended use. For example, these members can be of rectangular or tubular section of maximum strength.

The top frame member 3 is provided with a pair of parallel tracks 9 which extend lengthwise thereof and may be fixed to the frame 3. The lower frame member 2 is also provided with a pair of parallel track members 10 which extend longitudinally along frame 4 vertically below, and parallel to, tracks 9. Tracks 10 preferably are fixed to frame 4.

Positioned between top tracks 9 and bottom tracks 10 are two intermediate tracks comprising sections 11 and 12. Tracks 11, 12 are parallel to each other and positioned between, and parallel to, tracks 9 and 10. Tracks 11 are each hinged to two vertical posts 5 as at 13 so that they can be folded upwardly against the inner sides of

2 posts 5 during the loading of motor vehicles posts 5 during the loading of motor vehicle chassis A. In lowered position each track section 11 is supported by a brace 14 hinged to swing about a vertical axis 15 outwardly of the vehicle so that they clear lower tracks 10. The rear ends 16 of upper track members 9 and the rear ends 17 of track sections 11 terminate equidistant from end 18 of bottom frame member 4, that is, equidistant from the point at which track members 12 are hinged.

Although the track members 12 are preferably disconnectably hinged at their rear ends as at 18 to, or adjacent the rear end of, the lower frame member 4, the important point is that track sections 12 should be of such a length that in lowered position they cooperate with track sections 11 to form an intermediate track for supporting intermediate motor chassis C and in their elevated position, Fig. 4, they serve as a ramp up which motor chassis B can be run to load the same on to upper tracks 9.

The forward end of track section 12 is provided with a transverse opening 19 and the rear ends of track sections 11 and tracks 9 are bifurcated as at 20 to receive the forward ends of track section 12. The bifurcated ends 20 of tracks 9 and 11 are provided with holes 21. Thus, when the rear ends of either tracks 9 or 11 are aligned with the forward ends of tracks 12, a bolt 22 can be passed through eyes 21 and holes 19 to connect the forward ends of sections 12 when elevated to the rear ends of tracks 9 and when lowered to the rear ends of tracks 11.

The loading of my trailer is illustrated in the drawings. My trailer 2 is adapted to carry three motor chassis which, as shown, are bus chassis A, B and C. Either chassis A or B can be loaded first. As herein shown, Fig. 3, chassis A is being run on to the lower tracks 10. Before running chassis A on to the lower tracks 10, track sections 11 are pivoted upwardly into the dotted line position. Fig. 5. The support brackets 14 are folded outwardly to clear tracks 10 so that chassis A will have a clear path as it is rolled forwardly and loaded on my trailer and hinges 18 are disconnected so that track sections 12 can be removed.

After chassis A has been loaded, then track sections 12 are hinged at their rear ends by hinges 18 to the rear end of lower frame 4 and at their forward ends to the rear ends of upper tracks 9. This position of sections 12 is shown in Fig. 4. The trailer is now ready for the loading of chassis B which is rolled or driven up track sections 12, which now from a ramp, and on to tracks 9 in position above chassis A, as shown in Fig. 4. Brackets 14 are now swung inwardly to the position shown in Fig. 5 and track sections 11 swung down to chassis supporting position. Brackets 14 support the lowered track sections 11. Pins 21 are removed and track sections 12 are now swung down about hinges 18 and their forward ends connected by pins 22 to the rear ends of lowered track sections 11. Chassis C is now rolled or backed on to tracks 12, 11 so that the final position of chassis C is between chassis A and B.

To unload, the reverse of this method is followed; namely, chassis C is first rolled off the trailer track 11, 12, sections 12 are elevated to the position shown in Fig. 4 and connected to the rear ends of tracks 9 so that chassis B can be rolled off the trailer and finally track sections 12 are removed and track sections 11 and brackets 14 collapsed against the sides of the trailer to permit chassis A to be backed off the trailer.

It will be noted that upper tracks 9 and lower tracks 10 are spaced vertically their greatest distance at the longitudinal mid-section of the trailer and that tracks 9 converge downwardly and forwardly toward tracks 10 so that tracks 9 are closest to tracks 10 at the front end of the trailer. This arrangement is important because it permits chassis B to be positioned on top of chassis A within a minimum height so that the trailer, when loaded, will clear low bridges. Further, by having the mid-section of tracks 9 and 10 spaced further apart than the forward ends of the tracks, I am able to sandwich the rear end of chassis C between the rear ends of chassis A and B without requiring any greater overall height than is required at the forward end of the trailer where the front end of chassis B is positioned over the front end of chassis A. It will also be noted that the rear ends of tracks 10 and tracks 11, 12 converge toward the rear end of the trailer.

I claim:

1. A vehicle adapted for the transporting of automotive vehicle chassis comprising a frame, a pair of parallel upper tracks mounted on said frame, a pair of parallel lower tracks mounted on said frame, the said upper tracks converging downwardly at their forward ends toward the forward ends of said lower tracks, the lower tracks extending rearwardly beyond the upper tracks, and a pair of intermediate parallel tracks having a portion positioned below the rear portions of said upper tracks and between the rear portions of said upper tracks and the lower tracks, said intermediate tracks extending substantially boynd the rear ends of the upper tracks and converging downwardly toward the rear end of the vehicle with the rear ends of said lower tracks, said intermediate tracks being movably mounted on said frame so as to be shiftable to a position clear of said lower tracks when it is desired to load a vehicle chassis on said lower tracks whereby a vehicle chassis can be positioned on the upper track, a second vehicle chassis positioned on the lower track beneath the first vehicle chassis and thereafter a third vehicle chassis can be positioned on the intermediate track with a portion of the third vehicle chassis sandwiched between the rear portion of the first and second vehicle chassis and with the remainder of the third vehicle chassis projecting rearwardly of the other two vehicle chassis.

2. A vehicle adapted for the transporting of automotive vehicle chassis comprising a frame, a pair of parallel lower tracks mounted on said frame, a pair of parallel upper tracks mounted on said frame vertically above the lower tracks and spaced a greater distance from the lower tracks at the mid-section of said vehicle than at the forward end of said vehicle, the lower tracks extending rearwardly beyond the upper tracks, and a pair of intermediate parallel tracks having a portion positioned below the rear portions of said upper tracks and between the rear portions of said upper tracks and the lower tracks, said intermediate tracks extending substantially beyond the rear ends of the upper tracks and converging downwardly toward the rear end of the vehicle with the rear ends of the intermediate tracks positioned adjacent the rear ends of the lower tracks, said intermediate tracks being movably mounted on said frame so as to be shiftable to a position clear of said lower tracks when it is desired to load a vehicle chassis on said lower tracks whereby a vehicle chassis can be positioned on the upper track, a second vehicle chassis positioned on the lower track beneath the first vehicle chassis and thereafter a third vehicle chassis can be positioned on the intermediate track with a portion of the third vehicle chassis sandwiched between the rear portion of the first and second vehicle chassis and with the remainder of the third vehicle chassis projecting rearwardly of the other two vehicle chassis.

3. A vehicle adapted for the transporting of automotive vehicle chassis comprising a pair of parallel upper tracks, a pair of parallel lower tracks, the said upper tracks converging downwardly at their forward ends toward the forward ends of said lower tracks, the lower tracks extending rearwardly beyond the upper tracks, and a pair of intermediate parallel tracks between the rear portions of said upper tracks and the lower tracks and extending substantially beyond the rear ends of the upper tracks and converging downwardly toward the rear end of the vehicle with the rear ends of said lower tracks, said intermediate tracks each comprising front and rear sections, the rear sections terminating at a point adjacent the rear ends of the lower tracks, the rear ends of the upper tracks and the rear ends of said front sections terminating at a point equidistant from the rear ends of the rear sections, means for disconnectably connecting the rear ends of the front sections from the front ends of the rear sections whereby the rear sections can be elevated with their front ends adjacent the rear ends of the upper tracks and the rear ends adjacent the rear ends of the lower tracks to serve as ramps for loading a vehicle chassis on the upper tracks whereby a vehicle chassis can be positioned on the upper track, a second vehicle chassis positioned on the lower track beneath the first vehicle chassis and a third vehicle chassis can be positioned on the intermediate track with a portion of the third vehicle chassis sandwiched between the rear portion of the first and second vehicle chassis and with the remainder of the third vehicle chassis projecting rearwardly of the other two vehicle chassis.

4. The combination as set forth in claim 3 including means for hinging the front sections of the intermediate tracks so that they can be swung into a vertical position clear of the lower tracks preparatory to loading a vehicle chassis on the lower tracks and wherein the rear sections of the intermediate tracks are removable also preparatory to loading a vehicle chassis on the lower tracks.

5. In a vehicle adapted for the transporting of automotive vehicle chassis, a frame, a pair of parallel lower track members mounted on said frame, a second pair of parallel track members mounted on said frame above the lower track members and converging downwardly and rearwardly of the vehicle so that the rear ends of the lower and second pairs of track members are adjacent each other, the second mentioned track members when in vehicle supporting position overlying the lower track members, each track of the second pair of track members comprising a front and a rear section, hinge means for supporting said front track sections on said frame so that they can be swung into an upright position to thereby clear the lower tracks preparatory to loading a vehicle chassis on the lower tracks, a third pair of parallel track members mounted on said frame above said aforesaid track members, a hinge connection between the rear end of said frame and the rear end of each of said rear sections, the rear ends of the front sections and the rear ends of the upper tracks terminating substantially the same distance from the hinged connections at the rear ends of said rear sections whereby the rear sections can be swung from a position where the front ends of the rear sections are adjacent the rear ends of the front sections to a position where the front ends of the rear sections are adjacent the rear ends of the upper tracks, the said rear sections in the first position cooperating with said front sections to support a vehicle chassis and in said second position serving as a ramp for rolling a vehicle chassis upwardly on to the upper track members.

6. A vehicle adapted for transporting automotive vehicle chassis comprising a frame, a pair of parallel upper tracks on said frame, a pair of parallel lower tracks on said frame, said lower tracks extending rearwardly beyond the upper tracks, and a pair of intermediate parallel tracks positioned between said upper and lower tracks, the rear portions of said upper tracks overlying the front portions of said intermediate tracks and the rear portions of said intermediate tracks extending substantially beyond the rear ends of said upper tracks, said intermediate tracks being movably mounted on said frame so as to be shiftable to a position clear of said lower tracks when it is desired to load a vehicle chassis on said lower tracks, whereby a vehicle chassis can be positioned on the upper track, a second vehicle chassis positioned on the lower track beneath the first vehicle chassis and thereafter a third vehicle chassis can be positioned on the intermediate track with a portion of the third vehicle chassis sandwiched between the rear portion of the first and second vehicle chassis and with the remainder of the third vehicle chassis projecting rearwardly of the other two vehicle chassis.

7. A vehicle adapted for transporting automotive vehicle chassis comprising a frame, a pair of parallel upper tracks on said frame, a pair of parallel lower tracks on said frame, said lower tracks extending rearwardly beyond the upper tracks, and a pair of intermediate parallel tracks positioned between said upper and lower tracks and converging downwardly toward the rear end of the vehicle with the rear ends of said lower tracks, the rear portions of said upper tracks overlying the front portions of said intermediate tracks and the rear portions of said intermediate tracks extending substantially beyond the rear ends of said upper tracks, said intermediate tracks being movably mounted on said frame so as to be shiftable to a position clear of said lower tracks when it is desired to load a vehicle chassis on said lower tracks, whereby a vehicle chassis can be positioned on the upper track, a second vehicle chassis positioned on the lower track beneath the first vehicle chassis and a third vehicle chassis can be positioned on the intermediate track with a portion of the third vehicle chassis sandwiched between the rear portion of the first and second vehicle chassis and with the remainder of the third vehicle chassis projecting rearwardly of the other two vehicle chassis.

CLARENCE C. STUART.

REFERENCES CITED

The following references are of record in the file of this patent:

UNITED STATES PATENTS

| Number | Name | Date |
| --- | --- | --- |
| 1,809,557 | Lishon | June 9, 1931 |
| 1,894,534 | Dolan | Jan. 17, 1933 |
| 1,958,926 | Reid | May 15, 1934 |
| 2,004,439 | Judd | June 11, 1935 |
| 2,146,567 | Dondlinger | Feb. 7, 1939 |